(12) United States Patent
Brück et al.

(10) Patent No.: US 6,315,076 B1
(45) Date of Patent: Nov. 13, 2001

(54) CATALYTIC CONVERTER FOR A MUFFLER OF A SMALL ENGINE

(75) Inventors: Rolf Brück, Bergisch Gladbach; Jörg-Roman Konieczny, Siegburg, both of (DE)

(73) Assignee: Emitec Gesellschaft fur Emissionstechnologie mbH, Lohmar (DE)

(*) Notice: Subject to any disclaimer, the term of this patent is extended or adjusted under 35 U.S.C. 154(b) by 0 days.

(21) Appl. No.: 09/616,619

(22) Filed: Jul. 14, 2000

Related U.S. Application Data

(63) Continuation of application No. PCT/EP99/00044, filed on Jan. 7, 1999.

(30) Foreign Application Priority Data

Jan. 14, 1998 (DE) .............................. 198 01 122

(51) Int. Cl.[7] .................................................. F01N 1/24
(52) U.S. Cl. ................................. 181/258; 181/256
(58) Field of Search .............................. 181/258, 256, 181/230, 240, 269, 272; 60/299, 302

(56) References Cited

U.S. PATENT DOCUMENTS

| | | | |
|---|---|---|---|
| 4,894,987 | * 1/1990 | Harwood et al. | 60/299 |
| 4,941,545 | * 7/1990 | Wilcox et al. | 181/282 |
| 5,273,724 | 12/1993 | Bos . | |
| 5,338,903 | 8/1994 | Winberg . | |
| 5,355,973 | * 10/1994 | Wagner et al. | 181/258 |
| 6,109,386 | * 8/2000 | Maus et al. | 181/158 |
| 6,134,885 | * 10/2000 | Gilbertson | 60/312 |
| 6,158,214 | * 12/2000 | Kempka et al. | 60/302 |

FOREIGN PATENT DOCUMENTS

| | | |
|---|---|---|
| 38 29 668 A1 | 6/1998 | (DE) . |
| 0 470 113 B1 | 2/1993 | (EP) . |
| 0 785 342 A1 | 7/1997 | (EP) . |
| 0 816 648 A1 | 1/1998 | (EP) . |

\* cited by examiner

*Primary Examiner*—Jeffrey Donels
*Assistant Examiner*—Kim Lockett
(74) *Attorney, Agent, or Firm*—Herbert L. Lerner; Laurence A. Greenberg; Werner H. Stemer

(57) ABSTRACT

A catalytic converter for cleaning exhaust gas, particularly from a small engine, includes a converter housing and at least one honeycomb body disposed therein and containing layers of sheet metal having catalytically active material. The converter is disposed on a dividing wall of a muffler housing for a small engine. The dividing wall has at least one opening. The housing has an upper housing component and a lower housing component. The converter housing is shaped in such a way that exhaust gas can flow successively through the honeycomb body and the opening and the converter housing is spaced apart from the muffler housing. Such a converter can be manufactured cost-effectively, can easily be integrated into existing structures and does not lead to unacceptable temperatures of the outer wall of the muffler housing during operation.

18 Claims, 3 Drawing Sheets

CATALYTIC CONVERTER FOR A MUFFLER OF A SMALL ENGINE

CROSS-REFERENCE TO RELATED APPLICATION

This application is a continuation of copending International Application No. PCT/EP99/00044, filed Jan. 7, 1999, which designated the United States.

BACKGROUND OF THE INVENTION

Field of the Invention

The present invention relates to a catalytic converter for cleaning exhaust gas, including a converter housing and at least one honeycomb body disposed therein and containing layers of sheet metal having catalytically active material. The converter is disposed on a dividing wall of a muffler housing for a small engine, the dividing wall has at least one opening, and the housing has an upper housing component and a lower housing component.

As environmental consciousness has become stronger and exhaust gas regulations relating to the exhaust gases of internal combustion engines have become stricter, a need has arisen to provide catalytic exhaust gas cleaning in small engines. Small engines are understood below to be internal-combustion engines with an engine capacity of less than 200 $cm^3$, in particular less than 50 $cm^3$. Such engines are found, in particular, in lawnmowers, power saws, transportable power packs, two-wheeled vehicles and such applications. In particular, in power saws, lawnmowers and other garden implements driven by internal-combustion engines, someone using such an implement is frequently located directly in the region of the exhaust gases of the small engine over a relatively long period of time. Catalytic exhaust gas cleaning is particularly important for that reason.

European Patent 0 470 113 B1 discloses a metallic catalytic converter carrier body which is suitable in particular for attachment in the dividing wall of a muffler housing. However, the construction and type of configuration of that catalytic converter carrier body are not very well suited to many muffler configurations. In addition, the manufacture thereof involves a certain degree of complexity.

The exhaust gas which enters a muffler near to the engine is, as a rule, already at a high temperature of, for example, over 600° C. As a result of exothermal reactions in the catalytic converter, its temperature may also rise considerably, for example to 1000° C. German Published, Non-Prosecuted Patent Application DE 38 29 668 A1, corresponding to U.S. Pat. No. 4,867,270, discloses a protection mechanism for an exhaust gas muffler for two-stroke engines, in particular for portable implements such as power saws or the like, having a housing, a catalytic converter and an exhaust gas end pipe. The catalytic converter is disposed in a hollow body which is provided in the muffler housing with spacing on all sides and has an output with a tapering cross section in the direction of flow of the treated exhaust gas that leads the treated exhaust gas out of the housing. The mechanical structure of that exhaust gas muffler is very complex and requires a specifically constructed adaptation of the catalytic converter for the respective purpose of use. Furthermore, the exhaust gas muffler has a large volume.

The above-described configurations for the catalytic exhaust gas cleaning of small engines additionally require specially fabricated honeycomb bodies. The manufacture, catalytic coating and installation of those honeycomb bodies require a relatively large number of working steps and are therefore relatively expensive in comparison with equipment provided with a small engine. For that reason, the provision of a catalytic converter for a small engine is frequently dispensed with.

SUMMARY OF THE INVENTION

It is accordingly an object of the invention to provide a catalytic converter for a muffler of a small engine, which overcomes the herein afore-mentioned disadvantages of the heretofore-known devices of this general type, which is very cost-effective to manufacture, which requires the smallest possible changes to already existing small engines and their emission systems and which nevertheless catalytically removes a considerable portion of noxious substance from exhaust gas without, however, generating unacceptably high temperatures at outer surfaces of the emission system. With the foregoing and other objects in view here is provided, in accordance with the invention, in a small engine muffler housing including an upper housing component, a lower housing component and a dividing wall having at least one opening formed therein, a catalytic converter disposed on the dividing wall for cleaning exhaust gas, comprising at least one honeycomb body containing layers of sheet metal having catalytically active material; and a converter housing in which the at least one honeycomb body is disposed, the converter housing spaced apart from the muffler housing and fixed to the dividing wall, and the converter housing having a substantially half-shell shape for conducting an exhaust gas flow parallel to the dividing wall successively through the honeycomb body and through the at least one opening.

The exhaust gas which is to be cleaned flows, in a manner known per se, into a housing component of the muffler housing and from there out through the opening provided in the dividing wall into the converter housing in which there are located the layers of sheet metal that are coated with catalytic material and which are configured as a honeycomb body. The inverse flow, firstly through the converter housing and then through the opening in the dividing wall, is possible.

Since the converter housing of the catalytic converter according to the invention does not bear against the muffler housing, heating of the muffler housing by the catalytic converter is reduced or even avoided.

Since the converter housing of the catalytic converter according to the invention can be attached to the dividing wall of the muffler housing, a particularly simple and therefore cost-effective adaptation of the catalytic converter according to the invention to existing emission systems is possible. In fact, the converter merely has to be mounted on the dividing wall without any need for changes to the upper and/or lower housing component of the muffler housing. The catalytic converter and dividing wall can thus be prefabricated together and introduced into the usual process for fabricating the muffler.

In accordance with another feature of the invention, the converter housing has at least one side wall, one end wall, and a free space in the converter housing in the region of the end wall, the free space communicating with the opening in the dividing wall. This makes it possible to construct the catalytic converter as a separate component which a manufacturer of catalytic converters can supply as an assembly to a manufacturer of mufflers. The latter can then mount the catalytic converter according to the invention in a muffler housing.

In accordance with a further feature of the invention, the dividing wall of the muffler simultaneously forms a bottom wall of the converter housing. As a result, easier fabrication of a muffler which is equipped with the catalytic converter is made possible, since the converter and the dividing wall are constructed as one component which simply then has to be introduced between the lower and the upper housing components of the muffler housing and attached.

In accordance with an added feature of the invention, the layers of sheet metal which are provided for the honeycomb body can be squeezed, with plastic deformation, into the converter housing. As a result, a configuration of the catalytic converter according to the invention is obtained which is particularly simple in terms of production technology.

In accordance with an additional feature of the invention, there is provided a casing disposed around the honeycomb body. The casing serves as a support element for the individual layers of sheet metal of the honeycomb body so that the layers can be prefabricated and introduced into the casing before the casing is placed in the honeycomb body. The honeycomb body and the converter housing are thus constructed as separate components which can be connected to one another in a particularly simple way. The casing does not need to enclose the entire outer surface of the honeycomb body as long as it simply ensures that the honeycomb body holds together.

In accordance with yet another feature of the invention, the catalytic converter has a free space in the region of its end wall into which exhaust gas that is to be cleaned can flow.

The cleaned exhaust gas can flow out of the catalytic converter through another opening provided in the converter housing, preferably on the opposite end side which may be completely open.

In accordance with a concomitant feature of the invention, alternatively, there is provided an intermediate wall which divides the opening in the converter housing and the honeycomb body into two spaces in each case, the two spaces having a fluidic connection to one another in such a way that the opening in the converter housing constitutes an inlet opening for the exhaust gas to be cleaned and an outlet opening for cleaned exhaust gas. This means that just one opening has to be provided in the converter housing and/or the dividing wall.

The same advantage is achieved if not one honeycomb body but rather two honeycomb bodies are located in the converter housing. In this case, the intermediate wall can divide the two honeycomb bodies into two spaces in each case. These spaces also have a fluidic connection to one another in such a way that the opening again constitutes both an inlet opening and an outlet opening for exhaust gas.

Other features which are considered as characteristic for the invention are set forth in the appended claims.

Although the invention is illustrated and described herein as embodied in a catalytic converter for a muffler of a small engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
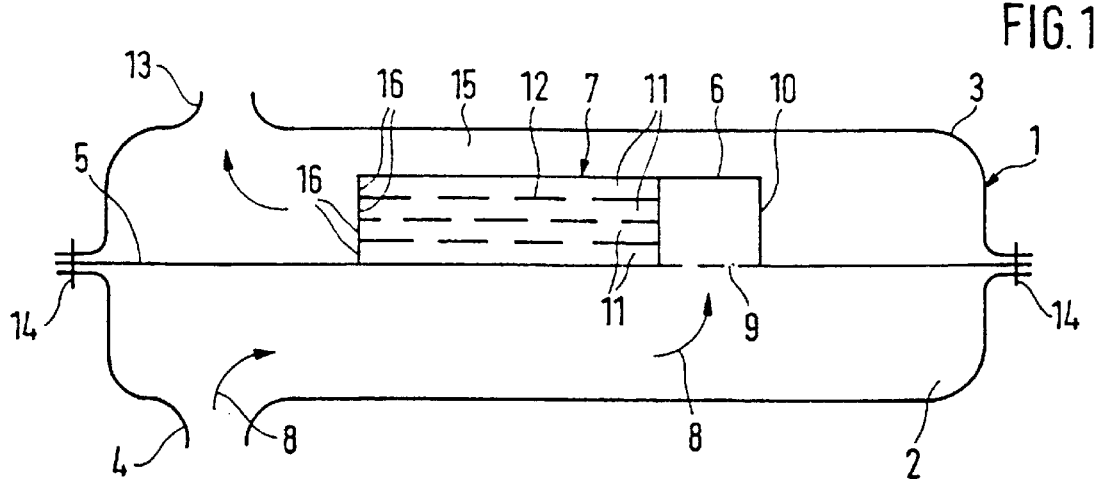
FIG. 1 is a diagrammatic, longitudinal-sectional view of a muffler housing in which a catalytic converter is located.

Referring now to the figures of the drawings in detail and first, particularly, to FIG. 1 thereof, there is seen a diagrammatic, longitudinal-sectional view of a muffler housing 1 for a small engine, in which the housing has a lower housing component 2 and an upper housing component 3. Exhaust gas passes through an exhaust gas inlet 4 into the lower housing component 2, from where it enters a converter housing 6 of a catalytic converter 7 through openings 9 in a dividing wall 5 which runs over the entire length of the muffler housing 1. A flow path of the exhaust gas is indicated by arrows 8. The exhaust gas flows through the openings 9 provided in the dividing wall 5, into a free space which is bounded by an end wall 10 of the converter housing 6, then through ducts 11 of a honeycomb body 12 and then it arrives at an exhaust gas outlet 13 located in the upper housing component 3. The lower housing component 2 and the upper housing component 3 of the muffler housing 1 are connected to one another in a gas-tight manner. In the example shown herein, the connection is made through the use of attachment elements 14 which are provided on the left-hand and right-hand ends of the muffler housing 1 in FIG. 1. However, it is self-evident that other types of connections of the lower housing component 2 to the upper housing component 3 may also be provided such as, for example, a common crimping of the two housing components 2, 3.

As is clear from FIG. 1, the converter housing 6 of the catalytic converter 7 does not touch the muffler housing 1. Instead, there is an insulation space 15 between the converter housing 6 and the upper housing component 3. Exhaust gas is located in the insulation space 15 during operation. This exhaust gas which is located in the insulation space 15 serves, as it were, as an insulator through the use of which the transmission of heat from the catalytic converter 7 to the muffler housing 1 is reduced. Of course, it is possible, as an alternative or in addition to the exhaust gas located in the insulation space 15, to provide insulation materials such as ceramic elements which reduce the conduction and convection of heat and/or a protective insulating layer which reduces thermal radiation and is composed of metal, for example. The housing 6 is open at the left-hand end of the converter housing 6 in FIG. 1, so that at this point exhaust gas may flow out of end openings 16 of the ducts 11.

Figure 2:
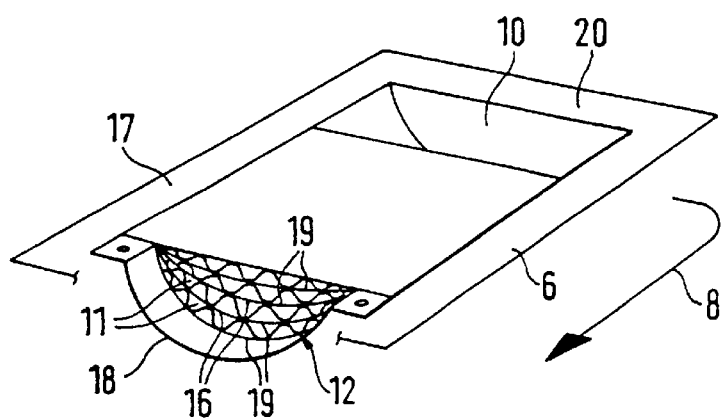
FIG. 2 is a perspective view of a catalytic converter having layers of sheet metal which are squeezed into a converter housing.

FIG. 2 shows an embodiment of a catalytic converter 7. The catalytic converter 7 has an approximately half-cylinder-shaped converter using 6 which has an essentially rectangular bottom wall 17 that is formed as a base surface (which may also be formed by the dividing wall 5). The bottom wall 17 is adjoined by an essentially half-shell-shaped housing component 18. Within the converter housing 6 is a plurality of layers of sheet metal 19 which are coated with a catalytic material. In the example shown herein, the layers of sheet metal 19 are formed from alternately disposed, individual flat layers of sheet metal and corrugated layers of sheet metal which together form a plurality of the ducts 11 through which exhaust gas can pass. It is to be noted that the coating may either already be applied to the layers of sheet metal 19 in a continuous process before all of the other processing steps or else it may be applied to all of the layers of sheet metal 19 together after they have been layered one on top of the other.

The path of the exhaust gas through the catalytic converter 7 in FIG. 2, which is shown through the use of the arrow 8, corresponds to the path shown in FIG. 1:

Exhaust gas which is to be cleaned enters the converter housing 6 in the region of the end wall 10 and passes from there into the ducts 11. After catalytic exhaust gas cleaning, the cleaned exhaust gas emerges from the end openings 16 again. The exhaust gas can also flow in the opposite direction. In that case, the catalytic converter more quickly reaches the temperature it needs for conversion, which is desirable. However, it also becomes hotter during continuous operation, which may be undesirable. This must be taken into account when selecting the direction of flow.

The converter housing 6 has an edge 20 which extends over each side of the bottom wall 17. The edge 20 is used for the secure mounting of the catalytic converter 7 on the dividing wall 5. It can be secured in a detachable or nondetachable manner. This makes it possible to attach the edge 20 to the dividing wall 5 by welding, soldering, riveting or some other measure.

Figure 3:
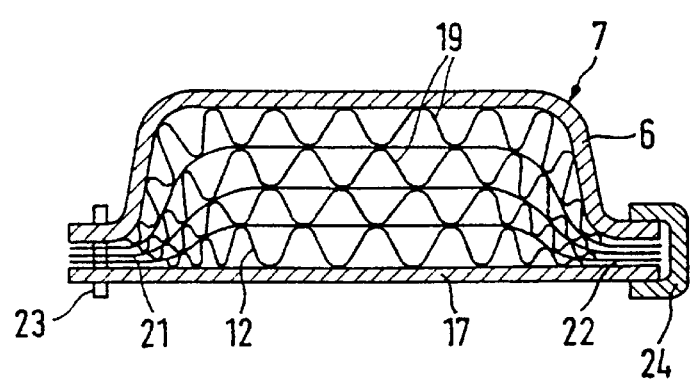
FIG. 3 is a front-sectional view of a catalytic converter having layers of sheet metal which are squeezed.

While FIG. 2 has shown a catalytic converter which is essentially semicircular in cross section, FIG. 3 shows a catalytic converter 7 which has an essentially rectangular cross section. Both the honeycomb body 12 which is shown in FIG. 2 and the honeycomb body 12 which is shown in cross section in FIG. 3 have layers of sheet metal 19 that include squeezed-in layers of sheet metal running in the left-hand and right-hand ends in the longitudinal direction of the muffler housing 1. Although the layers of sheet metal 19 are plastically deformed on the left-hand end 21 and the right-hand end 22, a high number of non-plastically deformed ducts 11, which allow for the catalytic conversion of exhaust gas that has been passed through, remain, in particular in the inner region of the honeycomb body 12. The ducts 11 are deformed considerably more elastically by the squeezing forces exerted on the entire honeycomb body 12, so that the entire body is under prestress. For this reason, an attachment element 23, for example a rivet, is provided on the left-hand end 21 and a bead is provided on the right-hand end 22, so that the honeycomb body 12 is reliably mounted in the converter housing 6.

Figure 4:
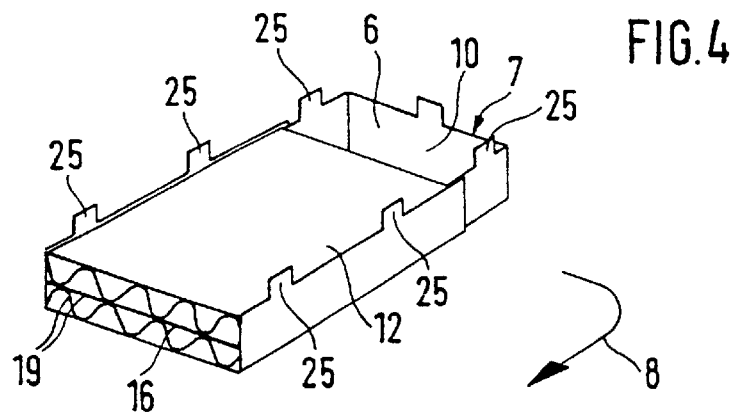
FIG. 4 is a perspective view of a catalytic converter with two layers of sheet metal which are divided from one another by an intermediate wall.

FIG. 4 shows an alternative embodiment of a catalytic converter 7. The catalytic converter which is shown therein has an essentially parallelepiped-shaped converter housing 6 in which there is a rectangular honeycomb body 12. The layers of sheet metal 19 which are provided are attached to the converter housing 6 in a manner that is known per se, for example by spot welding. The flow path 8 which the exhaust gas to be cleaned will take is identical to that shown in FIG. 2.

The catalytic converter 7 which is shown in FIG. 4 is attached to the dividing wall 5 through the use of seven attachment webs 25, for example. The attachment webs 25 are plugged through corresponding openings provided in the dividing wall 5, and are bent or twisted through approximately 90°, so that the converter housing 6 is secured to the dividing wall 5.

Figure 5:
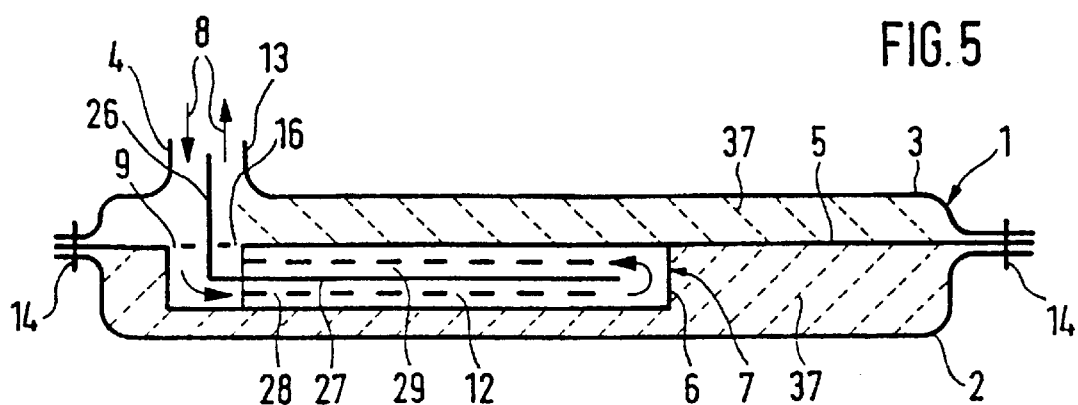
FIG. 5 is a longitudinal-sectional view of a muffler housing in which a catalytic converter is installed.

In the muffler housing shown in FIG. 1, the exhaust gas inlet 4 and the exhaust gas outlet 13 are disposed opposite one another, as viewed in the longitudinal direction of the muffler housing 1. However, this is not imperative, as illustrated in FIG. 5. There, the exhaust gas inlet 4 and the exhaust gas outlet 13 are located one directly next to the other in the upper housing component 3 of the muffler housing 1. The exhaust gas inlet 4 and the exhaust gas outlet 13 are separated from one another fluidically by a dividing wall 26, so that an exchange between the incoming exhaust gas and the outgoing exhaust gas is prevented.

The incoming exhaust gas enters the converter housing 6 of the catalytic converter 7 through the exhaust gas inlet 4 and passes through the openings 9 in the dividing wall 5. In the example shown in FIG. 5, the catalytic converter 7 is in the lower housing component 2. The catalytic converter 7 has an intermediate wall 27 which runs in the longitudinal direction of the muffler housing 1 and extends to the left-hand end of the catalytic converter 7 in FIG. 5 as far as the dividing wall 26, so that two sections 28 and 29 are formed in the catalytic converter 7. The sections 28 and 29 have a fluidic connection to one another at the right-hand end of the catalytic converter 7 shown in FIG. 5 by virtue of the fact that the intermediate wall 27 does not extend completely as far as the right-hand side of the catalytic converter 7 in FIG. 5. The exhaust gas which is to be cleaned enters an exhaust gas inlet section 28 and leaves again from an exhaust gas outlet section 29.

It is to be noted that the intermediate wall 27 separates an individual honeycomb body 12 accommodated in the converter housing 6 into the two sections 28, 29. However, it is also possible to accommodate two or more separate non-illustrated honeycomb bodies in the converter housing, in such a way that the bodies are separated by any desired number of intermediate walls. In this way, at least one exhaust gas inlet section and one exhaust gas outlet section, which communicate fluidically with one another, are also respectively provided.

Figure 6:
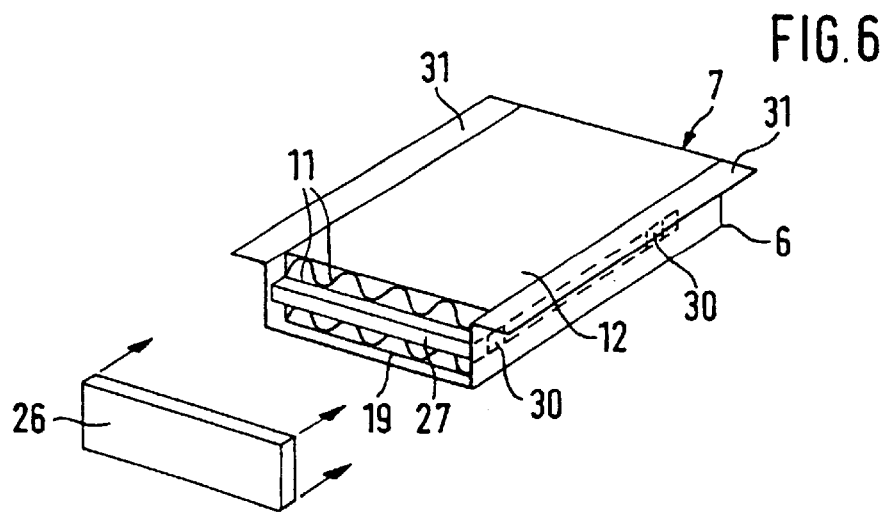
FIG. 6 is an exploded, perspective view of a catalytic converter which is enclosed by a casing.

The catalytic converter 7 which is illustrated in FIG. 5 is shown again in more detail in FIG. 6. The converter housing 6 is an essentially parallelepiped-shaped element in which a honeycomb body 12 is accommodated. There are layers of sheet metal 19 in the honeycomb body 12 which form ducts 11. The intermediate wall 27, which is parallel to the dividing wall 5, is disposed approximately centrally in the converter housing 6 and extends from a front end of the converter housing 6, as seen in FIG. 6, along essentially three quarters of the length of the converter housing 6, as is indicated by broken lines. The intermediate wall 27 is secured through the use of projections 30 which protrude therefrom and latch into corresponding openings in the converter housing 6.

The converter housing 6 has two edges 31 in the longitudinal direction which can be fastened to the dividing wall 5 in the lower housing component in a detachable or nondetachable manner, as already described with regard to FIG. 2. In this case, the part of the dividing wall 27 which can be seen in FIG. 6 comes into contact with the dividing end wall 26 in such a way that the sections 28, 29 which are shown in FIG. 5 are separated from one another.

Figure 7:
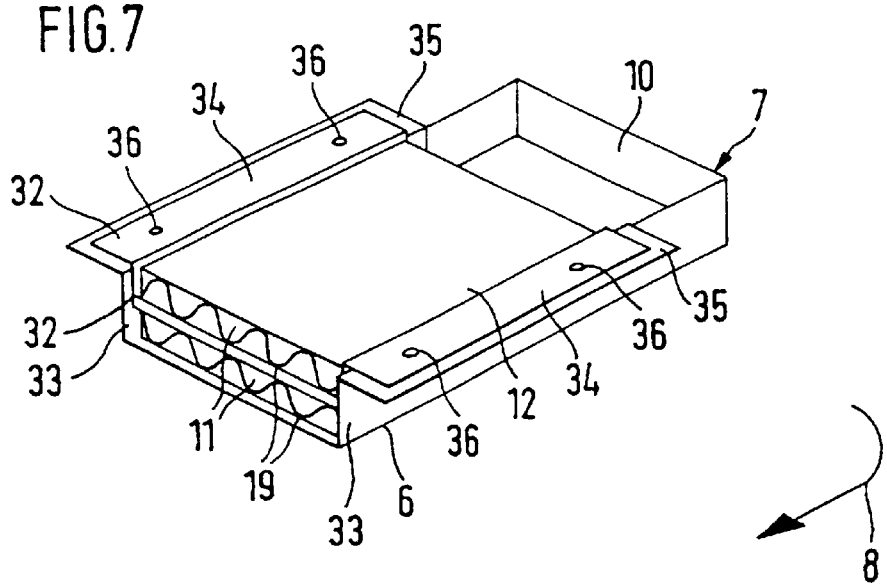
FIG. 7 is a perspective view of a catalytic converter having an uncoated flat layer.

A further embodiment of the catalytic converter 7 according to the invention is illustrated in FIG. 7. The catalytic converter 7 has an essentially parallelepiped-shaped converter housing 6, in which a honeycomb body 12 that is composed of layers of sheet metal 19 is disposed. A flat layer 32 which runs essentially parallel to the dividing wall 5 is disposed in the honeycomb body 12. In addition, part of the flat layer 32 bears against side walls 33 of the converter housing 6. The flat layer 32 has ends which are constructed as wings 34, which run in the longitudinal direction of the muffler and which bear on edges 35 of the converter housing 6 that protrude perpendicularly from the side walls 33.

Holes 36 are provided both in the wings 34 and in the edges 35. It is possible to insert attachment elements, such as rivets, through the holes into corresponding openings in the dividing wall 5 in order to fix the catalytic converter 7, together with the flat layer 32, securely to the dividing wall 5.

The attachment of the individual layers of sheet metal 19 can be carried out in a manner that is known per se. Thus, it is possible to braze or weld the layers to one another or to attach them in some other manner which is known per se. In addition, it is possible to attach the layers through the use of attachment elements, for example rivets or staples, or by spot welding or brazing, to the converter housing 6. Preferably, the points of attachment by brazing or soldering must be free of catalytically active coating.

Figure 8:
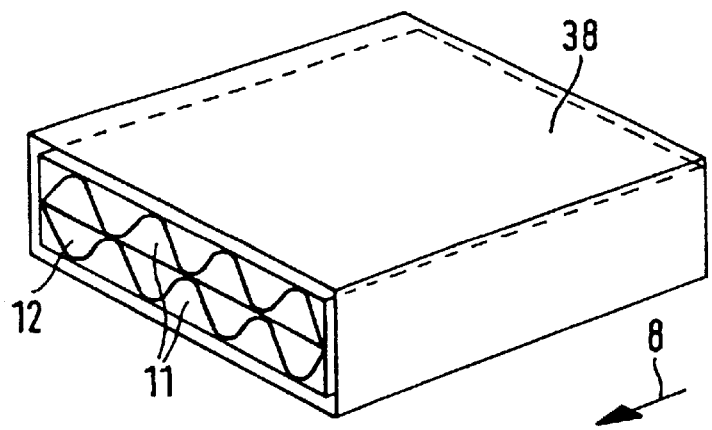
FIG. 8 is a perspective view of a honeycomb body surrounded by a casing.

The honeycomb bodies 12 which are discussed above may be surrounded by a casing. In FIG. 8, the honeycomb body 12 illustrated in FIG. 4 is surrounded by a casing 38 in such a way that the exhaust gas can flow freely through the ducts 11, as is also the case in the other exemplary embodiments. Due to the use of the casing 38, the honeycomb body 12 is constructed as a module which can be inserted into the converter housing 6 and it can be attached there in a detachable or nondetachable manner. This has the advantage of permitting honeycomb bodies to be prefabricated individually. In this case the casing 38 may be a very thin piece of sheet metal which does not necessarily have to surround the entire outer surface of the honeycomb body either, as long as it is ensured that the pieces of sheet metal are held together in a dimensionally stable way.

It is to be noted that any catalytic converter 7 may be provided with insulation material for thermal insulation. Furthermore, it is also possible to line the muffler housing 1 entirely or partially with insulation material 37, as is indicated in FIG. 5.

The present invention is particularly suitable for the simple manufacture of cost-effective catalytic converters for small engines emitting exhaust gas which contains considerable portions of hydrocarbons, at least some of which is to be removed catalytically and during which process other noxious substances such as carbon monoxide or nitrogen oxides, for example, can also be simultaneously reduced.

We claim:

1. In a small engine muffler housing including an upper housing component, a lower housing component and a dividing wall having at least one opening formed therein, a catalytic converter disposed on the dividing wall for cleaning exhaust gas, comprising:

at least one honeycomb body containing layers of sheet metal having catalytically active material; and a converter housing in which said at least one honeycomb body is disposed, said converter housing spaced apart from the muffler housing and fixed to the dividing wall, and said converter housing having a substantially half-shell shape for conducting an exhaust gas flow parallel to the dividing wall successively through the honeycomb body and through the at least one opening.

2. The converter according to claim 1, wherein said converter housing is attached to the dividing wall by spot welding.

3. The converter according to claim 1, wherein said converter housing is attached to the dividing wall by mechanical clamping.

4. The converter according to claim 1, wherein said converter housing has at least one side wall and an end wall.

5. The converter according to claim 1, wherein said converter housing has one wall formed by the dividing wall.

6. The converter according to claim 1, wherein said honeycomb body has a given cross section, and said converter housing has a substantially rectangular cross section corresponding to said given cross section.

7. The converter according to claim 1, wherein said honeycomb body has a given cross section, and said converter housing has a substantially semicircular cross section corresponding to said given cross section.

8. The converter according to claim 1, wherein said converter housing is formed of deep-drawn sheet metal.

9. The converter according to claim 1, wherein said converter housing has attachment webs engaging in corresponding openings formed in the dividing wall.

10. The converter according to claim 1, wherein said layers of sheet metal are squeezed in said converter housing with plastic deformation.

11. The converter according to claim 1, including a casing around said honeycomb body.

12. The converter according to claim 11, wherein said layers of sheet metal are attached in said casing.

13. The converter according to claim 11, wherein said casing is attached to at least one of the dividing wall and said converter housing.

14. The converter according to claim 1, wherein said layers of sheet metal are provided with a catalytically active surface layer before assembling the converter.

15. The converter according to claim 1, including a flat layer disposed within said layers of sheet metal, said flat layer having ends formed as wings disposed between said converter housing and the dividing wall.

16. The converter according to claim 1, wherein said layers of sheet metal are wound.

17. The converter according to claim 1, wherein said layers of sheet metal are folded.

18. The converter according to claim 1, including an intermediate wall dividing said converter housing and said honeycomb body into two spaces, said two spaces fluidically connected to one another and the at least one opening in the dividing wall forming an inlet opening for the exhaust gas to be cleaned and an outlet opening for cleaned exhaust gas.

* * * * *